Nov. 5, 1957 J. J. REGAN 2,812,100
COVERED VESSEL
Filed July 8, 1954
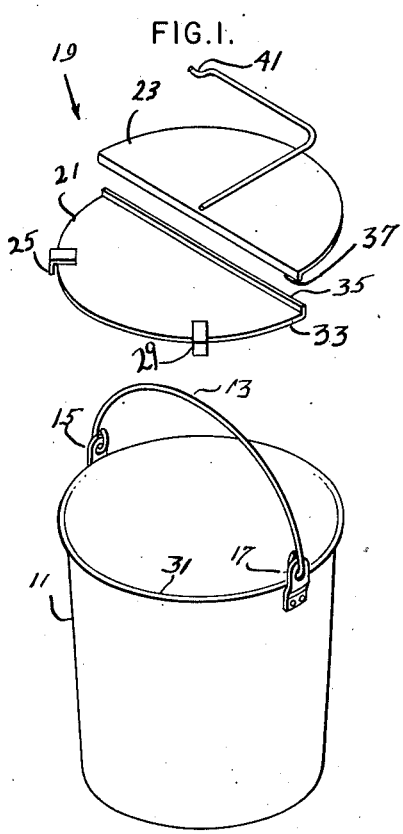
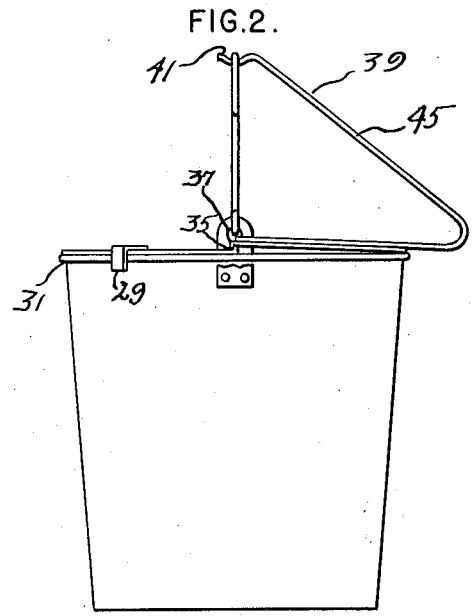
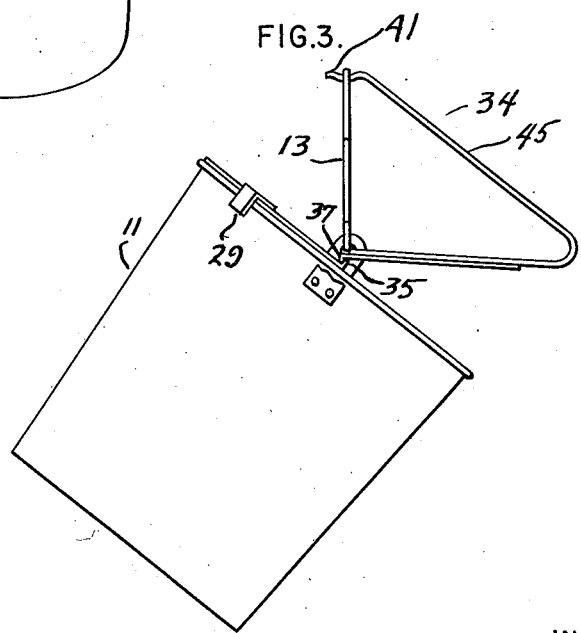
INVENTOR:
JOHN J. REGAN,
BY *John P. Murphy*
HIS ATTORNEY.

United States Patent Office 2,812,100
Patented Nov. 5, 1957

2,812,100

COVERED VESSEL

John J. Regan, Utica, N. Y.

Application July 8, 1954, Serial No. 442,046

3 Claims. (Cl. 220—36)

This invention relates to a vessel for transporting fluids, and, more particularly, to such a vessel having a cover positioned thereon.

On a dairy farm it is common practice to transport the milk from a cow stable to a milk room where the milk is strained and stored. Even in a well-cared for barn the air tends to be laden with dirt and other foreign particles. Further, during warm weather many flies are normally present in a barn, and if the barn has been recently sprayed, the flies will be falling to the ground. Such a condition is unsanitary and also can lead to milk spoilage.

Accordingly, it is a principal object of the present invention to provide an improved vessel for transporting milk and having a means for maintaining the contents thereof in an uncontaminated condition.

It is a further object of the present invention to provide an improved covered milk pail having an economical construction yet is easy to operate.

Since the purchase of an entire milk pail necessitates a considerable expenditure, it is desirable that a cover be provided that can be placed on existing pails and coact therewith.

Accordingly, another object of the present invention is to provide an improved cover that is adapted to existing vessels. A principal feature of the present invention is the provision of a two-piece cover having means, cooperating with a handle of a pail to raise and lower one-half of the cover.

The features of the present invention which are believed to be novel are set forth with particularity in the appended claims. The invention, itself, however, both as to its organization and method of operation, together with further objects and advantages thereof, may best be understood by reference to the following description when taken in conjunction with the accompanying drawings herein:

Fig. 1 is an exploded perspective view of an illustrative embodiment of the present invention;

Fig. 2 is a side view of the embodiment illustrated in Fig. 1, and

Fig. 3 is also a side view of the embodiment illustrated in Fig. 1 but shows the vessel in pouring position.

Referring now to Fig. 1, an illustrative embodiment of the present invention is therein shown comprising a milk pail 11 having a handle 13 retained thereon, as by ears 15 and 17. The handle 13 is rotatably attached to the pail 11, and, if desired, may have a ratchet construction to maintain the handle 13 in any desired position. A cover, designated generally by the numeral 19 comprises two semi-circular segments 21 and 23. The cover 19 may be of any desired material such as stainless steel. The segment 21 has means for maintaining it on the pail 11.

As illustrated in the drawing, the retaining means comprise angle sections 25 and 29. One leg of the sections 25 and 29 is attached by suitable means to the top of segment 21. The other leg of the sections 25 and 29 extends downwardly from the segment 21 into contact with an upper rim 31 on the pail 11, as shown in Figs. 2 and 3. A straight edge 33 of the segment 21 has a ridge 35 extending upwardly therefrom.

The semi-circular segment 23 has a ridge 37 depending therefrom. As will hereinafter be described, the ridges 35 and 37 cooperate to enable the raising of segment 23. A generally V-shaped metal spring 39 is fixedly attached to the segment 23 as by welding, soldering, or other suitable method. The upper end of the spring 39 has a depression 41 therein that is adapted to receive the handle 13 as shown in Figs. 2 and 3.

In operation, the segment 21 is placed on the pail 11 and is held thereon by angle sections 25 and 29. The segment 23 is then placed on the pail 11 with the depending ridge 37 thereof overlapping upstanding ridge 35 on segment 21 and in contact therewith. Upstanding leg 45 of spring 39 is then depressed and the handle 13 is raised into engagement with the depression 41 in the spring 39. As shown in Fig. 2, the pail 11 can be carried with the top entirely covered. When it is desired to pour from the pail 11, the handle is maintained in a vertical plane and the bottom of the pail 11 is rotated upwardly, and this causes the rim 31 of the pail 11 to separate from the segment 23 in a simple and convenient manner. When the desired amount of fluid has been poured, the pail 11 is returned to the vertical position, thereby automatically covering the opening therein.

The upstanding ridge 35 maintains the segment 21 on the pail when the pail is rotated because the ridge 35 is in contact with the depending ridge 37 which is urged in a downward direction by the spring 39, thereby enabling the segment 23 to pivot around the ridge 35 without losing contact therewith.

While the present invention has been described by reference to a particular embodiment thereof, it will of course be understood that numerous modifications may be made by those skilled in the art without departing from the spirit and scope of the invention. For instance, the pouring area may be made greater by including a larger section of the cover in the movable portion of the cover motivated by the pail handle.

What is claimed as new and is desired to be secured by United States Letters Patent is:

1. A vessel for containing a fluid comprising a generally cylindrical body portion having an opening in one end thereof, a handle rotatably attached to said body portion and rotatable to a position above said opening, a first semi-circular cover segment positioned on said body portion and covering one-half of said opening, means for retaining said first cover segment thereon, said first cover segment having an upstanding ridge along a straight edge thereof, a second semi-circular cover segment having a depending ridge extending from a straight edge thereof, said second cover segment being positioned on said body portion to cover the remainder of said opening with said depending ridge overlapping said upstanding ridge and in cooperating contact therewith, and a generally V-shaped spring having a first leg fixedly attached to said second circular segment and a second leg extending upwardly in the same plane as said first leg and at an acute angle with said second segment, said second leg having a depression in the end thereof removed from said cover adapted to engage said handle thereby to retain said ridges in cooperating contact and enable said second segment to be pivoted away from said opening when said handle is rotated.

2. A milk pail comprising a body having a circular opening at the top thereof, ears extending upwardly from said body on opposite sides of said opening, a semi-circular handle rotatably mounted on said body, a first cover segment partially covering said opening and in a fixed relation to said pail and having an upstanding ridge along a straight edge thereof, a second cover section covering the remainder of said opening and having a depending ridge extending from a straight edge thereof, said second cover section in contact with said first cover segment with said depending ridge overlapping said upstanding ridge, means rotatably engaging said second segment to said first segment, and spring means connected between said handle and said second segment to retain said handle in an upright position.

3. A milk pail comprising a body portion having an opening at the top thereof, a handle rotatably attached to said pail, a first semi-circular cover segment mounted on said body, covering a portion of said opening and having an upstanding ridge along a straight line thereof, a second semi-circular cover segment having a depending ridge extending from a straight edge thereof rotatably engaged to said upstanding ridge of said first cover segment and covering the remainder of said opening, and a V-shaped spring having one leg attached to said second cover segment and the other leg in engagement with said handle to urge said second cover segment into the closed position, thereby enabling said second cover segment to rotate away from said opening when said pail is rotated.

References Cited in the file of this patent

UNITED STATES PATENTS

| | | |
|---|---|---|
| 484,824 | Shilling | Oct. 25, 1892 |
| 493,834 | O'Leary | Mar. 21, 1893 |
| 625,523 | Totman | May 23, 1899 |
| 1,036,237 | Hirsohn | Aug. 20, 1912 |
| 1,098,727 | Hirsohn | June 2, 1914 |